United States Patent
Bierdel et al.

(10) Patent No.: US 10,207,424 B2
(45) Date of Patent: Feb. 19, 2019

(54) MIXING ELEMENTS HAVING AN IMPROVED DISPERSING EFFECT

(71) Applicant: Covestro Deutschland AG, Leverkusen (DE)

(72) Inventors: Michael Bierdel, Leverkusen (DE); Thomas König, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 109 days.

(21) Appl. No.: 15/325,579

(22) PCT Filed: Jul. 9, 2015

(86) PCT No.: PCT/EP2015/065705
§ 371 (c)(1),
(2) Date: Jan. 11, 2017

(87) PCT Pub. No.: WO2016/005498
PCT Pub. Date: Jan. 14, 2016

(65) Prior Publication Data
US 2017/0136426 A1    May 18, 2017

(30) Foreign Application Priority Data
Jul. 11, 2014 (EP) .................................... 14176663

(51) Int. Cl.
*B29B 7/00* (2006.01)
*B29C 47/00* (2006.01)
(Continued)

(52) U.S. Cl.
CPC .......... *B29B 7/489* (2013.01); *B01F 7/00416* (2013.01); *B01F 7/00891* (2013.01);
(Continued)

(58) Field of Classification Search
CPC ............ B01F 7/00891; B01F 7/00416; B29C 47/0861; B29C 47/40; B29C 47/402;
(Continued)

(56) References Cited

U.S. PATENT DOCUMENTS

| | | | | |
|---|---|---|---|---|
| 4,098,754 A | * | 7/1978 | Neuray | C08G 64/06 524/611 |
| 5,318,358 A | * | 6/1994 | Wobbe | B29B 7/489 366/319 |

(Continued)

FOREIGN PATENT DOCUMENTS

| | | |
|---|---|---|
| DE | 102007055764 A1 | 7/2008 |
| DE | 102009057139 A1 | 6/2011 |

(Continued)

OTHER PUBLICATIONS

International Search Report and Written Opinion for International Application No. PCT/EP2015/065705, European Patent Office, dated Oct. 7, 2015.

*Primary Examiner* — Anshu Bhatia (57) ABSTRACT

The invention relates to mixing elements that have a larger number of basic geometric periods per section and an improved dispersing effect for multi-shaft screw extruders comprising screw shafts that co-rotate in pairs. The invention further relates to the use of the mixing elements in multi-shaft screw extruders, a corresponding screw extruder comprising the mixing elements, and a method for extruding kneadable materials.

18 Claims, 8 Drawing Sheets

(51) Int. Cl.
  B29B 7/48 (2006.01)
  B29C 47/60 (2006.01)
  B29C 47/64 (2006.01)
  B01F 7/00 (2006.01)
  B29C 47/08 (2006.01)
  B29C 47/40 (2006.01)
  B29K 69/00 (2006.01)
  B29C 47/76 (2006.01)

(52) U.S. Cl.
  CPC .......... B29B 7/486 (2013.01); B29C 47/6068 (2013.01); B29C 47/6075 (2013.01); B29C 47/64 (2013.01); B01F 2215/0049 (2013.01); B01F 2215/0431 (2013.01); B29C 47/0861 (2013.01); B29C 47/40 (2013.01); B29C 47/402 (2013.01); B29C 47/6037 (2013.01); B29C 47/6043 (2013.01); B29C 47/76 (2013.01); B29C 2947/926 (2013.01); B29C 2947/92104 (2013.01); B29C 2947/92228 (2013.01); B29C 2947/92447 (2013.01); B29C 2947/92723 (2013.01); B29K 2069/00 (2013.01); Y02P 70/263 (2015.11)

(58) Field of Classification Search
  CPC . B29C 47/6037; B29C 47/6043; B29C 47/76; B29C 2947/92104; B29C 2947/92228; B29C 2947/92447; B29C 2947/926; B29C 2947/92723; B29K 2069/00
  See application file for complete search history.

(56) References Cited

U.S. PATENT DOCUMENTS

| 2008/0181051 A1 | 7/2008 | Yamaguchi et al. |
| 2011/0089602 A1 | 4/2011 | Nogata et al. |
| 2012/0281001 A1 | 11/2012 | König et al. |

FOREIGN PATENT DOCUMENTS

| EP | 0537450 A1 | 4/1993 |
| JP | 2001310369 A | 11/2001 |
| JP | 2011063015 A | 3/2011 |
| JP | 2012213996 A | 11/2012 |
| WO | WO 2009051279 A1 | 4/2009 |

* cited by examiner

Section A

Fig. 9

Section A

MIXING ELEMENTS HAVING AN IMPROVED DISPERSING EFFECT

CROSS-REFERENCE TO RELATED APPLICATIONS

This application is a U.S. national stage application, filed under 35 U.S.C. § 371, of PCT/EP2015/065705, which was filed on Jul. 9, 2015, and which claims priority to European Patent Application No. EP 14176663.4, filed Jul. 11, 2014, the contents of which are incorporated by reference into this specification.

FIELD

The invention relates to mixing elements having an increased number of base geometry periods per longitudinal section and an improved dispersing effect for multi-shaft screw extruders comprising screw shafts that co-rotate in pairs. The invention further relates to the use of the mixing elements in multi-shaft screw extruders, a corresponding screw extruder comprising the mixing elements, and a method for extruding plastic masses.

BACKGROUND

Co-rotating multi-shaft screw extruders have been known for a long time. A comprehensive over-view of such screw extruders is given in publication [1]=Kohlgrüber: The Co-Rotating Double-Screw Extruder. Hamer Publishing, Munich, 2007. Modern screw extruders have a modular system in which the various screw elements can be mounted on a core shaft. This allows the person skilled in the art to adapt the screw extruder to the process task in question. In this case, conveying elements, kneading elements, and/or mixing elements can be used and combined with one another.

For example, DE 102007055764 A1 discloses a screw for a twin-screw extruder having a screw main body comprising a combination of a plurality of segments with one another in the axial direction. The screw main body has a plurality of sections in the axial direction that perform various functions: a conveying section for conveying the material to be kneaded, a kneading section for kneading the material to be kneaded, and an extruding section for pressurizing and extruding the material to be kneaded.

One of the essential tasks carried out on multi-shaft screw extruders is the dispersion of liquid phases or liquid additives in polymer melts that cannot be homogeneously mixed with one another, or the dispersion of solids in polymer melts.

A further essential task carried out on multi-shaft screw extruders is the dispersion of a gaseous phase in a polymer melt. In a so-called degassing extruder, a gaseous phase serves as an entraining agent in a degassing zone downstream of the dispersion zone. The entraining agent causes (improved) foaming of the polymer melt, with a correspondingly larger free degassing surface area on the one hand and a partial reduction in pressure of the volatile substances to be degassed (monomers, oligomers, solvents) on the other. Examples of known entraining agents for this purpose are water, carbon dioxide, or nitrogen.

The quality of the dispersion has a multifaceted effect on the operating behavior of a screw extruder. Poor dispersion of gaseous, liquid, or solid additives reduces product quality as a result of inhomogeneities in the plastic masses. Poor dispersion of an entraining agent in the dispersion zone also causes degassing performance in a degassing zone downstream of the degassing zone to decrease, thus potentially making it impossible to achieve the desired residual concentrations of monomers, oligomers and solvents in the plastic mass.

Poor dispersion can be counteracted by increasing the rotational speed or decreasing the throughput. The drawback of both these measures is that this causes the temperature of the plastic mass processed in the screw extruder to increase, thus decreasing product quality due to increased damage kinetics.

DE 4134026 A1 discloses mixing elements that are suitable for dispersing fillers and liquid additives in polymer melts. The geometry of these mixing elements is based on a reverse-conveying, single-thread conveying element with an Erdmenger profile and have active-conveying grooves in their comb rows. Such mixing elements are known to the person skilled in the art as toothed mixing elements (TME).

DE 4134026 A1 discloses toothed mixing elements in which the pitch of the base geometry is 0.2 to 0.35 times the outer diameter of the toothed mixing element, with pitch being understood to denote the axial length required for a complete rotation of the screw profile. The pitch of the grooves is given as 2.5-6 times the outer diameter of the toothed mixing element.

JP 2001310369 A discloses toothed mixing elements in which the pitch of the base geometry is 0.1 to 0.5 times the outer diameter of the toothed mixing element.

JP 2012 213996 A discloses toothed mixing elements in which the pitch of the base geometry is 0.1 to 0.3 times the outer diameter of the toothed mixing element.

WO 2009/051279 A1 discloses mixing elements in which the pitch of the base geometry is 0.50 to 1.50 times the outer diameter. The mixing elements have 10 to 30 grooves per base geometry period.

However, it was observed in dispersion of a gaseous phase with a toothed mixing element according to DE 4134026 A1 that the bubbles formed are not homogenous in size, and that in particular, larger bubbles regularly occur. Large bubbles are detrimental in that their surface area-volume ratio is extremely small, with the result that a downstream degassing zone is provided with only a limited surface area for degassing. Moreover, it was observed that on addition of a gaseous phase to a polymer melt, in the area of the toothed mixing elements, only an axial length corresponding to the outer diameter of the toothed mixing elements is required in order to pre-disperse the added gaseous phase before the actual dispersion of the gaseous phase into more or less small bubbles begins.

SUMMARY

Taking the prior art as a point of departure, the object of the invention is therefore to provide mixing elements for multi-shaft screw extruders that allow the most favorable possible dispersion, particularly of gaseous additives, with the lowest possible energy input and the highest possible throughput.

This object was achieved by providing the mixing elements according to the present invention for multi-shaft screw extruders comprising screw shafts that co-rotate in pairs, wherein the number of base geometry periods in a longitudinal section that corresponds lengthwise to the outer diameter of the mixing elements is greater than or equal to 5.5, and wherein the mixing elements are characterized in that their base geometry is that of a reverse-conveying feeding element with a single-thread screw Erdmenger profile, the combs of which are provided with active-conveying grooves, and the pitch of the conveying grooves is at least 7 times the outer diameter of the mixing elements.

Surprisingly, it was found that mixing elements showing an increased number of base geometry periods per longitudinal section compared to the prior art provide improved dispersion with the same energy input and the same throughput.

Improved dispersion of gaseous, liquid, or solid additives as well as entraining agents makes it possible to achieve better product quality of the plastic mass with respect to improved homogeneity thereof and reduced residues of monomers, oligomers, and solvents. If improved dispersion and the corresponding improvement in product quality are not required, the rotational speed can be reduced until the previous product quality is restored, with the result that the temperatures in the plastic mass are lower and the specific energy requirement of the screw extruder decreases. Alternatively, the throughput can be increased until the previous product quality is restored, with the result that on the one hand, the temperatures in the plastic mass are lower and the specific energy requirement of the screw extruder decreases, and on the other, the fixed costs per product amount of the plastic mass are reduced.

The use of the mixing elements according to the present invention therefore makes it possible to reduce specific energy input and thus improve the quality of the product, or to increase product throughput and nevertheless achieve a dispersion comparable to those of prior art.

The term screw extruder within the meaning of the invention is to be understood as denoting a double-shaft extruder, a multi-shaft extruder, or a ring extruder. In the following, the term screw extruder is used as a generic term for these three types of screw extruders. A screw extruder comprises one or a plurality of barrels with two or more intermeshing barrel holes that are essentially axially parallel and two or more interlocking screw shafts that co-rotate in pairs. The screw shafts may have any desired combination of conveying elements, kneading elements, and/or mixing elements.

A conveying element (cf. [1], pp. 227-248) is characterized in that the screw profile is continuously helically twisted in an axial direction and moved forward. The conveying element can be right- or left-handed, and depending on the direction of rotation of the screw extruder, may be active-conveying or reverse-conveying. The pitch T of the conveying element is preferably in the range of 0.1 times to 10 times the outer diameter, wherein the pitch is understood to be the axial length required for a complete rotation of the screw profile. For practical reasons, the axial length of a conveying element is preferably implemented in whole multiples of T/Z, where Z is the number of turns.

A kneading element (cf. [1], pp. 227-248) is characterized in that the screw profile is intermittently moved forward in an axial direction by means of kneading disks, each of which is separated from the others by a groove. The offset angle OA between the kneading disks is preferably in the range of 10° to 180°. The arrangement of the kneading disks can be right- or left-handed. Depending on the direction of rotation of the screw extruder, a kneading element can be active-conveying, feed-neutral, or reverse-conveying. The axial length of the kneading disks LK is preferably in the range of 0.02 to 2 times the outer diameter. The axial length of the groove LG between two adjacent kneading disks is preferably in the range of 0.001 to 0.1 times the outer diameter. Within the meaning of the invention, the pitch T of a kneading element is understood to refer to the axial length required for a complete, intermittent rotation of the kneading disks, i.e. T=360/OA*(LK+LG). The pitch T of the kneading element is preferably in the range of 0.1 to 10 times the outer diameter. For practical reasons, the axial length of a kneading element is preferably implemented in whole multiples of T/Z, where Z is the number of turns.

Among other methods, mixing elements (cf. [1], pp. 227-248) can be formed by configuring conveying elements with openings in the screw combs. Such mixing elements can be right- or left-handed. The pitch T of such mixing elements is preferably in the range of 0.1 to 10 times the outer diameter. Analogously to the conveying elements, the axial length of a mixing element is preferably implemented in whole multiples of T/Z. The openings are preferably in the form of a U- or V-shaped groove. The grooves of a mixing element are preferably arranged axially parallel or counter-conveying relative to the pitch of the conveying element upon which said mixing element is based. Depending on the pitch of the conveying element upon which it is based and the number, size, form, and pitch of the grooves, a mixing element can be active-conveying, feed-neutral, or reverse-conveying. The pitch of the grooves is understood to be the axial length required for a complete rotation of a groove around the longitudinal axis of the mixing element.

Mixing elements are further formed by configuring kneading elements with openings in the kneading disks. Such mixing elements can be right- or left-handed. The pitch T of such mixing elements is preferably in the range of 0.1 to 10 times the outer diameter. Analogously to the kneading elements, the axial length of a mixing element is preferably implemented in whole multiples of T/Z. The openings are preferably in the form of a U- or V-shaped groove. The grooves of a mixing element are preferably arranged axially parallel or counter-conveying relative to the pitch of the kneading element upon which said mixing element is based. Depending on the pitch of the kneading element upon which it is based and the number, size, form, and pitch of the grooves, a mixing element can be active-conveying, feed-neutral, or reverse-conveying. The pitch of the grooves is understood to be the axial length required for a complete rotation of a groove around the longitudinal axis of the mixing element.

Mixing elements are further formed by an alternating sequence of pitchless rings having openings (cf. [1], pp. 227-248). Alternating means that in a pair of shafts, the rings on the shafts alternate in an axial direction. The outer diameter of the rings is preferably in the range of 0.9 to 0.998 times the barrel inner diameter. The openings are preferably in the form of a U- or V-shaped groove. The grooves of a mixing element are preferably arranged axially parallel, conveying, or counter-conveying. The pitch of the grooves is understood to be the axial length required for a complete rotation of a groove around the longitudinal axis of the mixing element. Such mixing elements are known to the person skilled in the art as toothed blocks (TB) or as toothed block elements (TME).

The geometry of the conveying element, kneading element, or toothed block upon which a mixing element is based is referred to within the meaning of the invention as the base geometry of the mixing element, or in abbreviated form simply as the base geometry.

The base geometry period length tb is understood within the meaning of the invention to refer to the axial length of the smallest geometric repeating unit of the conveying element, kneading element, or toothed block upon which a mixing element is based.

In single-thread conveying elements, the base geometry period length tb is equal to the pitch T, i.e. tb=T. In double-thread conveying elements, the base geometry period length tb is equal to half of the pitch T, i.e. tb=T/2. In general, the base geometry period length tb of a conveying element with a number of turns Z is equal to the pitch T divided by the number of turns Z, i.e. tb=T/Z.

In single-thread kneading elements, the base geometry period length tb is equal to the pitch T, i.e. tb=T. In double-thread kneading elements, the base geometry period length tb is equal to half of the pitch T, i.e. tb=T/2. In general, the base geometry period length tb of a kneading elements with a number of turns Z is equal to the pitch T divided by the number of turns Z, i.e. tb=T/Z.

In toothed blocks, the base geometry period length tb is understood to be the length required for one alternation of the rings on a pair of shafts.

Within the meaning of the invention, the number of base geometry periods nb is understood to refer to the axial length corresponding lengthwise to the outer diameter of a mixing element Da divided by the base geometry period length, i.e. nb=Da/tb.

BRIEF DESCRIPTION OF THE DRAWINGS

The present invention is elucidated in detail hereinafter with reference to figures and working examples. The figures show.

DETAILED DESCRIPTION

In a preferred embodiment of the mixing elements according to the present invention, the number of base geometry periods nb in an axial longitudinal section that corresponds lengthwise to the outer diameter of the mixing element is greater than or equal to 5.5, preferably greater than or equal to 7, and less than or equal to 10. It was found that at a value of more than 10, the strength of the screw combs or the kneading disks is no longer sufficiently ensured.

The mixing elements according to the present invention have the base geometry of a reverse-conveying feeding element with a single-thread screw Erdmenger profile whose combs are provided with active-conveying grooves. These mixing elements are known to the person skilled in the art as so-called toothed mixing elements (TME). According to the invention, the pitch of the active-conveying grooves of the toothed mixing elements according to the invention is at least 7 times the outer diameter of the mixing elements, and particularly preferably at least 9 times the outer diameter of the mixing elements. The toothed mixing elements may have any desired number of grooves. The number of grooves is preferably in the range of 6 to 20, and particularly preferably 8 to 16. The grooves can be U- or V-shaped.

The use of the mixing elements according to the present invention in a multi-shaft screw extruder is also subject matter of the present invention.

The mixing elements according to the present invention are preferably used in double-shaft screw extruders. In this case, the mixing elements according to the present invention can be combined with other screw elements, particularly conveying elements, kneading elements, and/or mixing elements.

A screw extruder comprising two or a plurality of screw shafts that have the following sequence of screw elements as a dispersion zone is also subject matter of the present invention:
(i) active-conveying screw elements, preferably active-conveying feeding elements or active-conveying kneading elements,
(iii) mixing elements according to the invention, and
(v) active-conveying screw elements, preferably active-conveying feeding elements or active-conveying kneading elements.

In a preferred embodiment, the screw shafts comprise the following sequence of screw elements as a dispersion zone:
(i) active-conveying screw elements, preferably active-conveying feeding elements or active-conveying kneading elements,
(ii) at least one reverse-conveying screw element, preferably reverse-conveying feeding elements or reverse-conveying kneading elements,
(iii) mixing elements according to the invention,
(iv) at least one reverse-conveying screw element, preferably reverse-conveying feeding elements or reverse-conveying kneading elements, and
(v) active-conveying screw elements, preferably active-conveying feeding elements or active-conveying kneading elements.

The screw extruder can contain a plurality of dispersion zones comprising the aforementioned sequences (i) to (v). The screw extruder preferably contains 1 to 8, particularly preferably 1 to 6, and most preferably 1 to 4 dispersion zones. The dispersion zones serve to disperse an additive, preferably an entraining agent, as finely as possible in a polymer melt.

Conveying elements, kneading elements, and/or mixing elements can be used as screw elements (i), (ii), (iv), and (v). Conveying elements or kneading elements are preferably used as screw elements (i) and (v). Conveying elements are preferably used as screw elements (ii) and (iv).

By incorporating one or a plurality of reverse-conveying, pressure-consuming screw elements (ii), one can prevent a gaseous additive to be dispersed, which is preferably fed in downstream of (ii), from escaping in an upstream direction. The pressure level in the partial area of the dispersion zone comprising the mixing elements according to the present invention (iii) can be adjusted by using one or a plurality of pressure-consuming screw element(s) (iv).

The mixing elements (iii) preferably have a smaller outer diameter than at least one of the screw elements (i) and (ii) and at least one of the screw elements (iv) and (v).

An important operating parameter of a screw extruder is volume flow V (unit $[m^3/s]$). In order to obtain the same operating behavior in screw extruders of different sizes, the extruders must be operated at the same dimensionless volume flow Q (unit [1]). As shown in [1] on pp. 129 to 146, dimensionless volume flow Q is calculated from volume flow V divided by the product of extruder rotational speed n (unit [1/s]) and the third power of the internal diameter of the barrel Dg (unit $[m^3]$). This gives the following mathematical formula: $Q=V/(nDg^3)$. As shown in publication [2]=Process Technology, VDI Publishing, Dusseldorf, 2013 on pp. 53 to 66, typical dimensionless throughputs of a compounding extruder are in the range of Q=0.06-0.15, and typical dimension-less throughputs of a degassing extruder are in the range of Q=0.03-0.06.

An important operating parameter of a screw element is its dimensionless intrinsic throughput A1 (unit [1]). Dimensionless intrinsic throughput A1 is understood to refer to the dimensionless throughput achieved by a screw element when the screw element is completely filled with a plastic mass and the pressure gradient along the screw element is equal to zero. Depending on the geometry of the screw element, screw elements can have a positive A1, A1=0, or a negative A1. Active-conveying feeding and kneading elements have a positive A1. Backward-conveying feeding and kneading elements have a negative A1. In the case of spacer sleeves or double-thread kneading elements, whose kneading disks are offset by 90° relative to one another, the dimensionless intrinsic throughput is A1=0. In mixing elements, the dimensionless intrinsic throughput can be adjusted by selecting the pitch of the grooves between negative and positive intrinsic throughput. Screw elements whose dimensionless intrinsic throughput A1 is less than or equal to the dimensionless volume flow Q through the screw extruder are always completely filled with the plastic mass in the screw extruder. Screw elements whose dimensionless intrinsic throughput A1 is greater than the dimensionless volume flow Q through the screw extruder can be filled or partially filled in the screw extruder.

The intrinsic throughput A1 of mixing elements according to the invention is preferably a maximum of 0.8, and particularly preferably a maximum of 0.6 times the dimensionless volume flow Q. This is advantageous in that the mixing elements according to the present invention are filled to a sufficient extent even in the case of minor malfunctions or low capacity utilization.

A method for extruding plastic masses in a screw extruder according to the invention is also subject matter of the present invention.

A plastic mass is understood to be a deformable mass. Examples of plastic masses are polymer melts, primarily of thermoplastics and elastomers, mixtures of polymer melts, or dispersions of polymer melts with solids, liquids, or gases.

In the method for extruding plastic masses according to the invention, the mixing elements (iii) are preferably used for the dispersion of gaseous, liquid, or powdered additives, and particularly preferably a gaseous entraining agent, in the plastic mass. A particularly preferable entraining agent is nitrogen.

Examples of plastic masses that can be extruded according to the invention with high efficiency while protecting the product include suspensions, pastes, glass, ceramic masses, metals in the form of a melt, plastics, plastic melts, polymer solutions, and elastomer and rubber masses.

Plastics and polymer solutions are preferably used, and particularly preferably thermoplastic polymers. As a thermoplastic polymer, at least one substance from the group of polycarbonate, polyimide, polyesters, particularly polybutylene terephthalate and polyethylene terephthalate, polyethers, thermoplastic polyurethane, polyacetal, fluoropolymers, particularly polyvinylidene fluoride, polyether sulfone, polyolefins, particularly polyethylene and polypropylene, polyimide, polyacrylate, particularly poly(methyl) methacrylate, polyphenylene oxide, polyphenylene sulfide, polyether ketone, polyaryl ether ketone, styrene polymerizates, particularly polystyrene, styrene copolymers, particularly styrene-acrylonitrile copolymer, acrylonitrile-butadiene-styrene block copolymers, and polyvinyl chloride is preferably used. It is also preferred to use so-called blends of the plastics listed above, with this being understood by the person skilled in the art to refer to a combination of two or more plastics. Particularly preferably, the method according to the invention is used in the production and compounding of polycarbonate. This is particularly advantageous with respect to the color of the polycarbonate, which is measured in non-dyed polycarbonate by the yellowness index (YI).

As is known, polycarbonates can be produced according to the boundary process or the melt trans-esterification process. In both production processes, polycarbonates are obtained that contain residual amounts of monomers, oligomers and/or solvents. The method according to the invention is suitable for at least partially removing these volatile components.

In the boundary process for producing polycarbonates, solvents including aromatic chlorinated hydrocarbons such as chlorobenzene and dichloromethane are used, and residual amounts thereof in the final product are undesirable because they have an adverse effect on the polycarbonate. By means of the increased dispersing effect of the mixing elements according to the present invention (iii), the residual concentration can be further reduced, or thermal damage and production of decomposition products can be prevented by using a lower rotational speed of the extruder than in methods of the prior art. Efficient concentration of the polycarbonate solution and evaporation of solvent residues while avoiding thermal damage is extremely important in order to obtain polycarbonate having favorable optical properties.

The method of polycarbonate synthesis according to the phase boundary process is widely described in the literature, for example in Schnell, "Chemistry and Physics of Polycarbonates," Polymer Reviews, Volume 9, Interscience Publishers, New York, London, Sydney 1964, pp. 33-70.

In the phase boundary process, a disodium salt of a bisphenol (or a mixture of various phenols) is first placed in an aqueous alkaline solution (or suspension), and the mixture is then phosgenated in the presence of an inert organic solvent or solvent mixture, which forms a second phase. The resulting oligocarbonates, which are chiefly present in the organic phase, are condensed using suitable catalysts to high-molecular-weight polycarbonates dissolved in the organic phase. Finally, the organic phase is separated and washed in a multi-stage process in order to remove residual amounts of sodium and the catalyst. After the reaction, the organic phase typically contains 10-20 wt. % of polycarbonate.

The polycarbonate must then be isolated from the organic phase. The conventional methods for concentrating the polycarbonate solution and isolating the polycarbonate are described in the patent literature and in textbooks, and are known to the person skilled in the art. Isolation of the polycarbonate from the solution is preferably carried out by evaporating the solvent by means of temperature or a vacuum. In order to directly obtain the melt phase after evaporation of the solvent, this method requires the use of a high-boiling-point (>100° C.) solvent such as chlorobenzene. In order to improve the solubility of the polymer in the solvent during the reaction, a mixture of one or a plurality of high-boiling-point solvents and low-boiling-point dichloromethane is also used. The weight ratio of dichloromethane to the high-boiling-point solvent is typically approx. 1:1.

A possible method for producing polycarbonate without any detectable residual solvent content is production according to the transesterification process. This method is also described in Schnell, "Chemistry and Physics of Polycarbonates." In this method, the monomers, a bisphenol, or a mixture of various bisphenols is reacted with a diaryl carbonate or a mixture of various diaryl carbonates in an equilibrium reaction. In this reaction, a phenol or a mixture of phenols are produced as a byproduct. The desired molecular weight is gradually achieved by removing these phenols.

Polycarbonates produced after the transesterification process inevitably contain phenols produced in the reaction, as well as residual amounts of bisphenol monomers and diaryl carbonates (such as diphenyl carbonate). Residual amounts of diphenyl carbonates are e.g. in the range of 200 to 700 ppm. These substances also have a detrimental effect. They are partially released by the processor during processes such as injection molding and extrusion, thus leading to unpleasant odors and environmental pollution. In injection molding, moreover, they can lead to the formation of deposits and therefore reduced service life. On contact with food, they can also pass from the polycarbonate into the food, causing changes in taste. Water is particularly susceptible to changes in taste. Phenols in particular tend to form halogenated phenols when food containers made of polycarbonate come into contact on cleaning and/or disinfection with chloroactive agents or strongly oxidizing agents in the presence of chlorine or bromine ions. The taste threshold value of phenol in water is given in the literature as 10 µg/L (Young & Crane et al., 1996), and that of halogenated phenols is lower by a factor of approx. 500 (H. Burttschel et al., J. Am. Water Works Assoc., 51: 205 (1959), "Chlorine Derivative of Phenol Causing Taste and Odor" and C. Joll et al., Curtin University of Technology, Centre for Applied Organic Geochemistry, "The Chemistry of Halophenol Tastes in Perth Drinking Water"). Residual amounts of phenol in polycarbonate therefore have a particularly unfavorable effect on drinking water.

A further possible method of producing polycarbonate lies in the phosgenation of bisphenols in the presence of pyridine or mixtures of pyridine and chlorobenzene, as described for example in US 314,432. Because of their intense, unpleasant odor, polycarbonates containing residual amounts of pyridine are completely unsuitable for food product applications.

Halogenated solvents show sensory thresholds that are similarly low to those of phenols and their halogenated derivatives. Although they are less soluble and migrate more slowly because of their low diffusion constants, they may pass into water depending on the conditions, thus causing changes in taste. In taste tests, test subjects have detected changes in taste at chlorobenzene levels in water of as low as 1 ppb. In order to definitively rule out such changes in taste, the residual chlorobenzene content in drinking water bottles made from polycarbonate must be lower than 10 ppm.

A further possibility for producing polycarbonate is to conduct the reaction at the phase boundary with subsequent isolation of the polycarbonate from the organic solvent by injection of a heated gas, primarily water vapor, in order to drive out the volatile components. In this process, the polycarbonate solution is sprayed with the carrier gas, and polycarbonate precipitates as a solid, primarily as an aqueous suspension. Other isolation methods include crystallization and precipitation, as well as baking out of the solvent residues in the solid phase. The latter method requires the use of dichloromethane as a solvent. However, residues of dichloromethane in the polycarbonate have a particularly detrimental effect, as dichloromethane is known to split off hydrochloric acid during processing together with residual moisture and can thus cause discoloration of the polycarbonate and corrosion of tools. At increased temperatures, dichloromethane can also cause losses in quality such as discoloration and gel formation during reprocessing.

In the production of phosgene from chlorine and carbon monoxide required for the phase boundary process, it is known that the optionally present auxiliary component methane is converted to carbon tetrachloride. In the spraying process, the concentration of high-boiling-point carbon tetrachloride increases relative to the low-boiling-point dichloromethane, with the result that after the spraying process, the residual content of carbon tetrachloride may be in the range of up to 2 ppm. As is known to the person skilled in the art, residual amounts of carbon tetrachloride in the product are particularly undesirable.

A further method is the isolation of polycarbonate from a solution by injecting vapors of aromatic, non-chlorinated aromatic compounds such as benzene, toluene, ethylbenzene, or various xylenes into a polycarbonate solution in dichloromethane followed by solidification and drying, as described for example in DE 3429960. Residues of aromatic compounds can also have the effect of causing changes in taste. A method for the safe removal of carbon tetrachloride and dichloromethane is not disclosed in DE 3429960. A considerable drawback of this method becomes evident in industrial implementation. For this reason, it is imperative for reasons of economy and environmental protection to close the material cycles. Above all, the aromatics used must be recycled into the process after removal from the polycarbonate. Low-molecular weight components of the polycarbonate such as thermally unstable bisphenols are evaporated together with the solvent during drying. They can be subjected to thermal, and optionally oxidative stress in the cycle. The method of converting e.g. bisphenols under thermal stress into colored, primarily yellow compounds is known to the person skilled in the art. These colored compounds become colored in the cycle, with the result that in continuous operation, they cause continuous deterioration of the colors of the polycarbonate produced.

Residues of high-boiling-point solvents such as aromatic hydrocarbons and chlorohydrocarbons also have detrimental effects. They are partially released by the processor during processes such as injection molding and extrusion, thus leading to unpleasant odors and environmental pollution. In injection molding, moreover, they can lead to the formation of deposits and therefore reduced service life. On contact with food, they can also pass from the polycarbonate into the food, causing changes in taste. A negative effect on taste can be detected at residual concentrations of as little as 10 ppm or more of aromatic chlorohydrocarbons in the polycarbonate.

In known evaporation methods, polycarbonate solutions are repeatedly heated under slight excess pressure to temperatures above the boiling point, and these overheated solutions are then expanded in a vessel, with the pressure in the vessel being lower than the corresponding vapor pressure in the solution. Repetition of the method is genally favorable, as the concentration of polycarbonate in the solution after the reaction is relatively low and this repetition makes it possible to prevent excessive overheating. Common methods for equipment-based evaporation of polycarbonate solutions are known to the person skilled in the art. For example, the overheated solution can be expanded in a heated helical tube that leads into a separator.

Above a particular concentration of polycarbonate (approx. 60 wt. %), vaporization by flash evaporation is made difficult by the high viscosities. It is generally preferable to remove the residual solvent by means of other methods, equipment, and machines.

The screw extruder according to the invention can be used to remove residues of volatile components. An entraining agent is preferably used to enlarge the degassing surface area.

If an entraining agent is used, this entraining agent is preferably added according to the invention in the area of the mixing elements (iii) and is dispersed by said elements in the polymer melt. Nitrogen can preferably be used as an entraining agent. The volume flow of the added entraining agent should preferably be 0.05 wt. % to 0.3 wt. %. After degassing, one may add additives, and optionally a flow of molten polycarbonate, which are mixed in a pressurization zone with the main flow. The additives are preferably pre-mixed in a polycarbonate flow, with it being particularly preferable to use a mixture of polycarbonate according to the invention.

Further materials preferred for use are rubbers. At least one of the group composed of styrene-butadiene rubber, natural rubber, butadiene rubber, isoprene rubber, ethylene-propylene-diene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta-percha, arylate rubber, fluorinated rubber, silicone rubber, sulfide rubber, and chlorosulfonyl polyethylene is preferably used as a rubber. Of course, a combination of two or more of the aforementioned rubbers or a combination of one or a plurality of rubbers with one or a plurality of plastics is also possible.

These thermoplastics and elastomers can be used in pure form or as mixtures with fillers and reinforcers such as glass fibers in particular, as mixtures with one another or with other polymers, or as mixtures with commonly-used polymer additives.

In a preferred embodiment, the plastic masses, particularly polymer melts and mixtures of polymer melts, are mixed with additives. These can be added together with the polymer in the form of solids, liquids, or solutions to the extruder, or at least a portion of the additives or all of the additives can be fed to the extruder in a lateral flow.

Additives can impart a wide variety of properties to a polymer. Examples of such additives include dyes, pigments, processing auxiliaries, fillers, antioxidants, reinforcers, UV absorbers and light stabilizers, metal deactivators, peroxide scavengers, basic stabilizers, nucleating agents, benzofurans and indolinones active as stabilizers or antioxidants, mold release agents, flame-retardant additives, antistatic agents, colorants, and melt stabilizers. Examples thereof are carbon black, glass fibers, clay, mica, graphite fibers, titanium dioxide, carbon fibers, carbon nanotubes, ionic liquids, and natural fibers.

In another preferred embodiment, the plastic masses fed to the screw extruder contain monomers, oligomers, and/or solvents, which are at least partially removed by the method according to the invention. In this preferred embodiment, a gaseous entraining agent is dispersed in the plastic mass using the mixing elements (iii). This entraining agent is then preferably removed in a subsequent step by applying a vacuum.

In the following, the invention is explained in further detail with reference to the figures, but without limiting its scope. FIGS. 1 through 10 were generated using a computer program. In order to facilitate their application to different extruder sizes, dimensionless geometric parameters are used for the outer diameter, core diameter, and screw clearance. Barrel inner diameter Dg is used as a reference parameter, as this parameter is not changed on an extruder. The dimensionless parameters are specified to 3 decimal places, as is the base geometry period length. The number of base geometry periods is specified to 2 decimal places.

Figure 1:
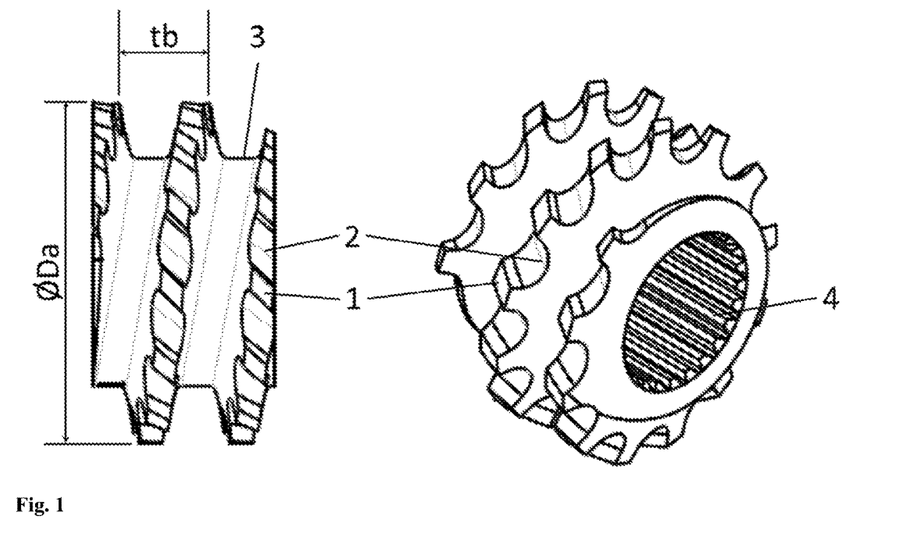
FIG. 1 shows a classical toothed mixing element (TME) according to DE 4134026 A1 whose number of base geometry periods is equal to 3.75 and whose groove pitch is 3.20 times the outer diameter of the mixing element. The diagram at left shows a side view, and the diagram at right shows an isometric view.

FIG. 1 shows a toothed mixing element according to prior art with the teeth (1), the grooves (2), the screw thread (3), the inner toothing (4), the base geometry length tb, and the outer diameter Da. The dimensionless outer diameter at the tips of the teeth (1) is 0.966. The dimensionless core diameter at the bottom of the screw thread (3) is 0.647. The dimensionless screw clearance is 0.017. The base geometry period length tb is 0.266 times the outer diameter of the toothed mixing element. The number of base geometry periods is therefore nb=3.75. The number of grooves (2) is 12, and the pitch of the grooves is 3.20 times the outer diameter of the toothed mixing element.

Figure 2:
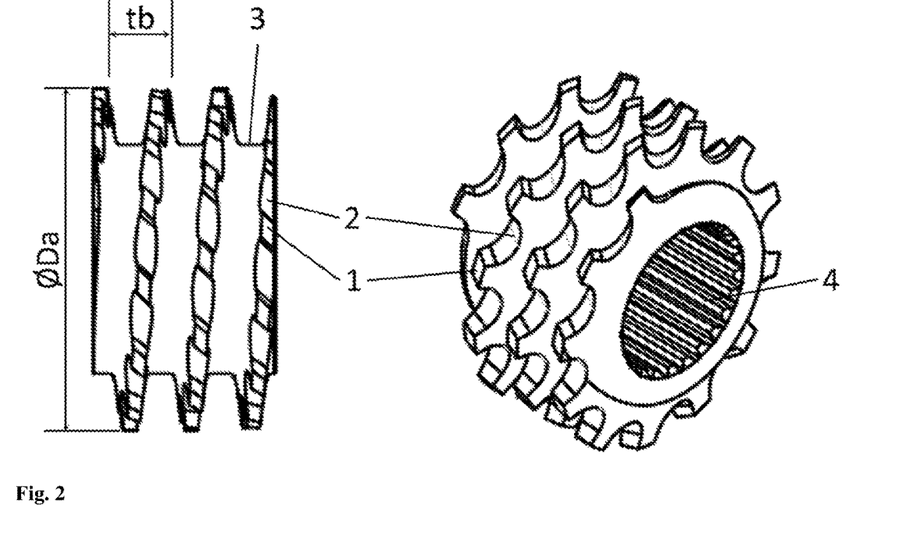
FIG. 2 shows a variant of a toothed mixing element whose number of base geometry periods is equal to 5.63 and whose groove pitch is 3.20 times the outer diameter of the mixing element. The diagram at left shows a side view, and the diagram at right shows an isometric view.

FIG. 2 shows a toothed mixing element with the teeth (1), the grooves (2), the screw thread (3), the inner toothing (4), the base geometry length tb, and the outer diameter Da. The dimensionless outer diameter at the tips of the teeth (1) is 0.966. The dimensionless core diameter at the bottom of the screw thread (3) is 0.647. The dimensionless screw clearance is 0.017. The pitch of the base geometry is 0.178 times the outer diameter of the toothed mixing element. The number of base geometry periods is therefore nb=5.63. The number of grooves (2) is 12, and the pitch of the grooves is 3.20 times the outer diameter of the toothed mixing element.

Figure 3:
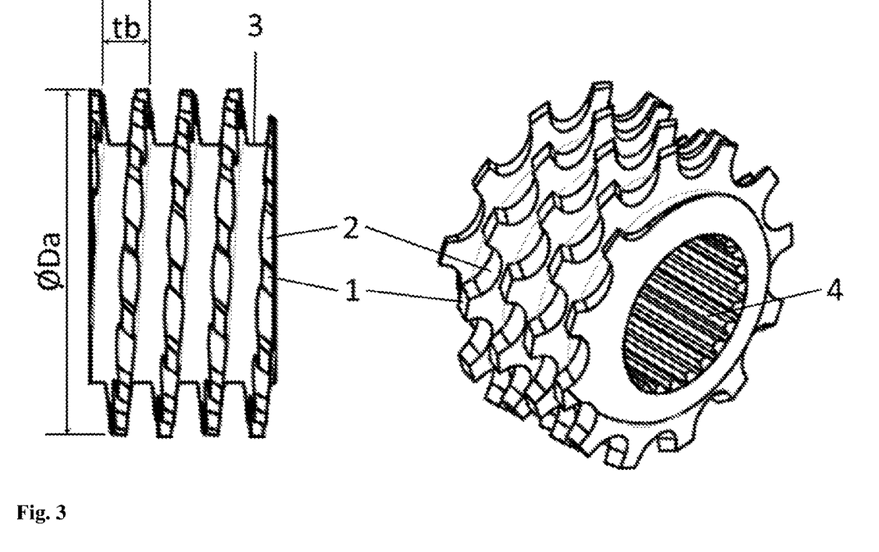
FIG. 3 shows a variant of a toothed mixing element whose number of base geometry periods is equal to 7.51 and whose groove pitch is 3.20 times the outer diameter of the mixing element. The diagram at left shows a side view, and the diagram at right shows an isometric view.

FIG. 3 shows a toothed mixing element with the teeth (1), the grooves (2), the screw thread (3), the inner toothing (4), the base geometry length tb, and the outer diameter Da. The dimensionless outer diameter at the tips of the teeth (1) is 0.966. The dimensionless core diameter at the bottom of the screw thread (3) is 0.664. The dimensionless screw clearance is 0.009. The pitch of the base geometry is 0.133 times the outer diameter of the toothed mixing element. The number of base geometry periods is therefore nb=7.51. The number of grooves (2) is 12, and the pitch of the grooves is 3.20 times the outer diameter of the toothed mixing element.

Figure 4:
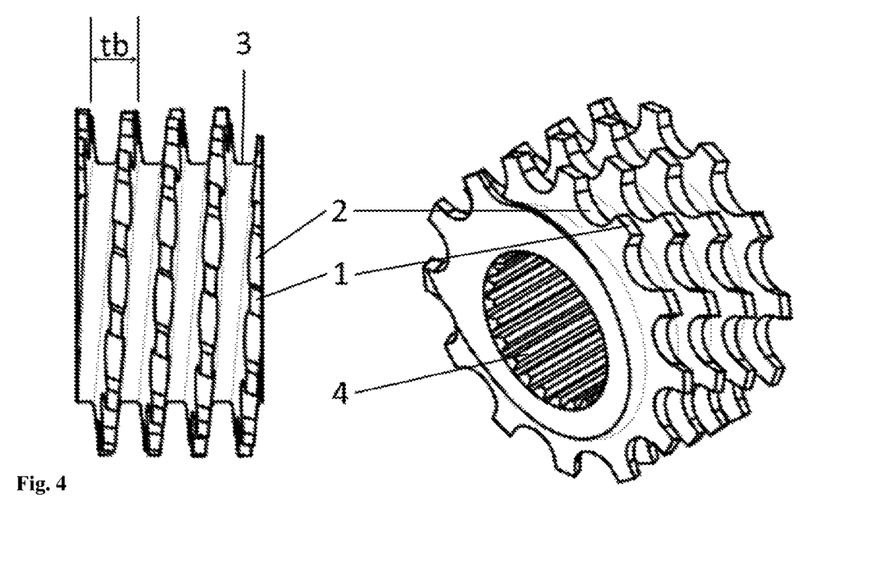
FIG. 4 shows a variant of a toothed mixing element whose number of base geometry periods is equal to 7.51 and whose groove pitch is 6.39 times the outer diameter of the mixing element. The diagram at left shows a side view, and the diagram at right shows an isometric view.

FIG. 4 shows a toothed mixing element with the teeth (1), the grooves (2), the screw thread (3), the inner toothing (4), and the base geometry length tb. The dimensionless outer diameter at the tips of the teeth (1) is 0.966. The dimensionless core diameter at the bottom of the screw thread (3) is 0.664. The dimensionless screw clearance is 0.009. The pitch of the base geometry is 0.133 times the outer diameter of the toothed mixing element. The number of base geometry periods is therefore nb=7.51. The number of grooves (2) is 12, and the pitch of the grooves is 6.39 times the outer diameter of the toothed mixing element.

Figure 5:
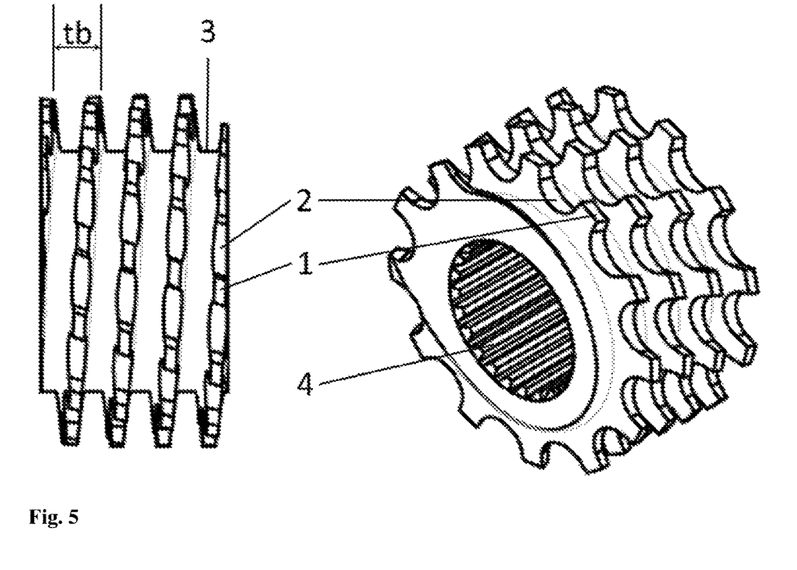
FIG. 5 shows a variant according to the invention of a toothed mixing element whose number of base geometry periods is equal to 7.51 and whose groove pitch is 7.99 times the outer diameter of the mixing element. The diagram at left shows a side view, and the diagram at right shows an isometric view.

FIG. 5 shows a novel toothed mixing element with the teeth (1), the grooves (2), the screw thread (3), the inner toothing (4), and the base geometry length tb. The dimensionless outer diameter at the tips of the teeth (1) is 0.966. The dimensionless core diameter at the bottom of the screw thread (3) is 0.664. The dimensionless screw clearance is 0.009. The pitch of the base geometry is 0.133 times the outer diameter of the toothed mixing element. The number of base geometry periods is therefore nb=7.51. The number of grooves (2) is 12, and the pitch of the grooves is 7.99 times the outer diameter of the toothed mixing element.

Figure 6:
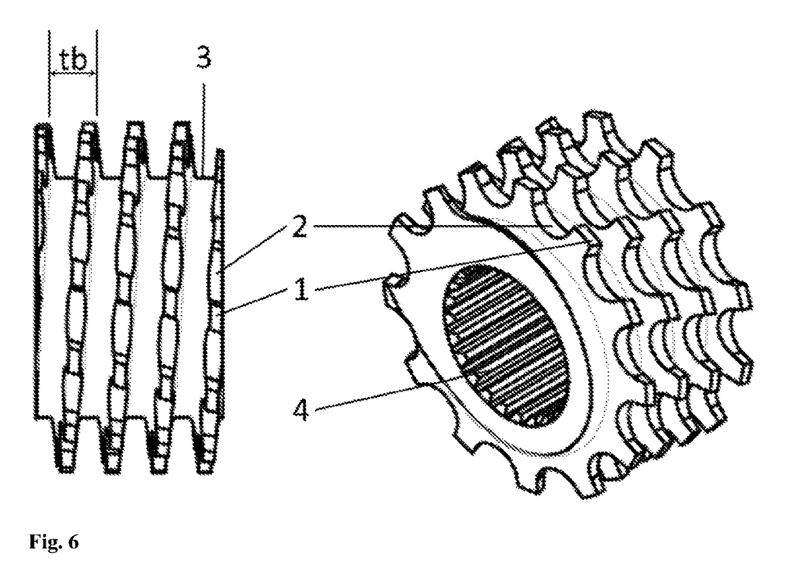
FIG. 6 shows a variant according to the invention of a toothed mixing element whose number of base geometry periods is equal to 7.51 and whose groove pitch is 9.59 times the outer diameter of the mixing element. The diagram at left shows a side view, and the diagram at right shows an isometric view.

FIG. 6 shows a novel toothed mixing element with the teeth (1), the grooves (2), the screw thread (3), the inner toothing (4), and the base geometry length tb. The dimensionless outer diameter at the tips of the teeth (1) is 0.966. The dimensionless core diameter at the bottom of the screw thread (3) is 0.664. The dimensionless screw clearance is 0.009. The pitch of the base geometry is 0.133 times the outer diameter of the toothed mixing element. The number of base geometry periods is therefore nb=7.51. The number of grooves (2) is 12, and the pitch of the grooves is 9.59 times the outer diameter of the toothed mixing element.

Figure 7:
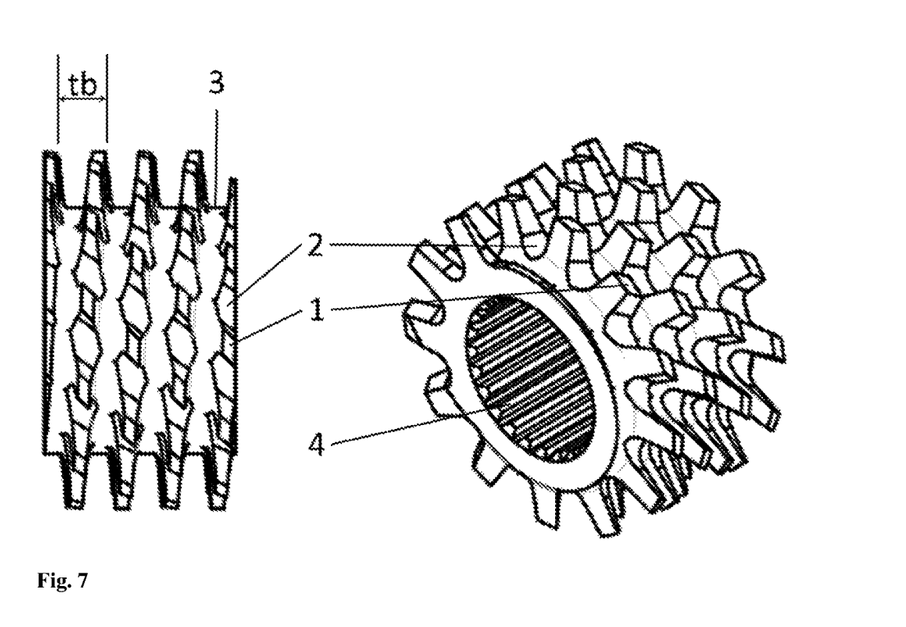
FIG. 7 shows a variant of a toothed mixing element whose number of base geometry periods is equal to 7.51 and whose groove pitch is 3.20 times the outer diameter of the mixing element, wherein the grooves extend to the core diameter. The diagram at left shows a side view, and the diagram at right shows an isometric view.

FIG. 7 shows a toothed mixing element with the teeth (1), the grooves (2), the screw thread (3), the inner toothing (4), and the base geometry length tb. The dimensionless outer diameter at the tips of the teeth (1) is 0.966. The dimensionless core diameter at the bottom of the screw thread (3) is 0.664. The dimensionless screw clearance is 0.009. The pitch of the base geometry is 0.133 times the outer diameter of the toothed mixing element. The number of base geometry periods is therefore nb=7.51. The number of grooves (2) is 12, the pitch of the grooves is 3.2 times the outer diameter of the toothed mixing element, and the grooves extended down to the core diameter.

Figure 8:
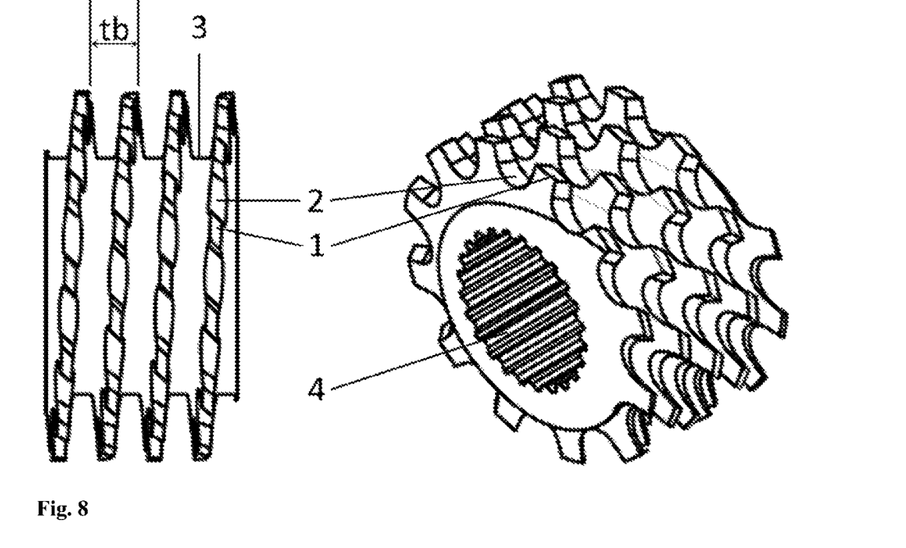
FIG. 8 shows a variant according to the invention of a toothed mixing element whose number of base geometry periods is equal to 7.51 and whose groove pitch is 3.20 times the outer diameter of the mixing element. The diagram at left shows a side view, and the diagram at right shows an isometric view.

FIG. 8 shows a novel toothed mixing element with the teeth (1), the grooves (2), the screw thread (3), the inner toothing (4), and the base geometry length tb. The dimensionless outer diameter at the tips of the teeth (1) is 0.991. The dimensionless core diameter at the bottom of the screw thread (3) is 0.638. The dimensionless screw clearance is 0.009. The pitch of the base geometry is 0.133 times the outer diameter of the toothed mixing element. The number of base geometry periods is there-fore nb=7.51. The number of grooves (2) is 12, and the pitch of the grooves is 3.2 times the outer diameter of the toothed mixing element.

For the screw profile of mixing elements according to the invention, the clearances used between the screws are preferably in the range of 0.1 to 0.001 relative to the outer diameter of the mixing element, particularly preferably 0.002 to 0.05 and very particularly preferably 0.004 to 0.02. As is known to the person skilled in the art, the clearances between the screw and the barrel and between the screws can be the same or different. The clearances can also be constant, or within the limits given, variable. It is also possible to insert a screw profile within the clearances. Possible clearance strategies are the method described in [1] on pp. 28 ff. of increasing the axial distance, the method of longitudinal section equidistants, and the method of spatial equidistants, all of which are known to the person skilled in the art. In increasing the axial distance, a screw profile of smaller diameter is constructed and is separated by the amount of clearance between the screws. In the method of longitudinal section equidistants, the longitudinal section profile curve is shifted inward (parallel to the axis) by half of the clearance between the screws. In the method of spatial equidistants, based on the spatial curve along which the mixing elements clean themselves, the mixing element is enlarged in the direction perpendicular to the surfaces of the precise cleaning profile by the amount of clearance between screws. The longitudinal section equidistants and the spatial equidistants are preferably used, with the spatial equidistants being particularly preferred.

Figure 9:
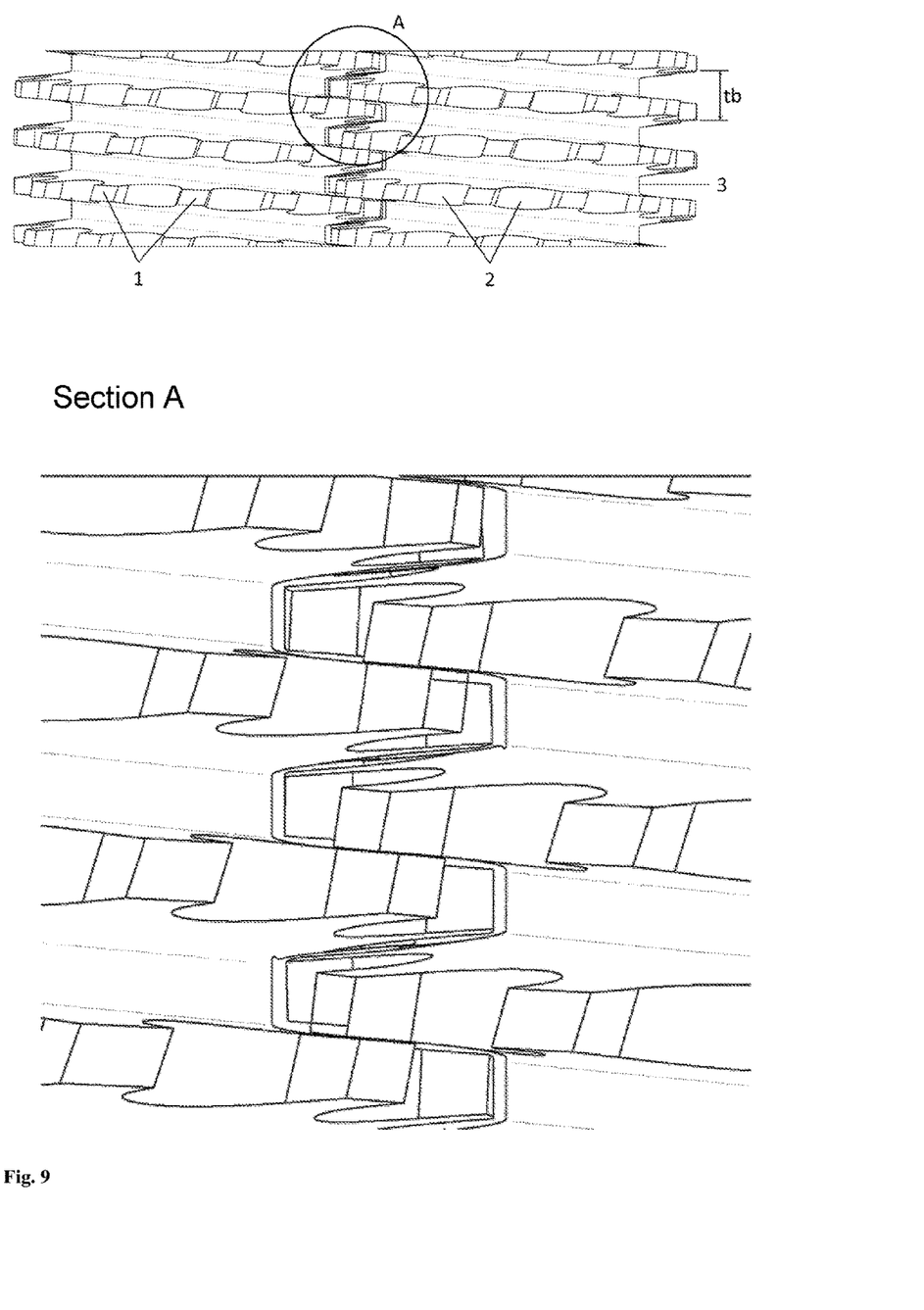
FIG. 9 shows a pair of toothed mixing elements according to the invention whose number of base geometry periods is equal to 7.51 and whose groove pitch is 7.99 times the outer diameter of the mixing element. The clearance strategy used is the increase in axial distance that results in an uneven radial and axial clearance between the two mixing elements. The upper diagram shows a side view of the pair of toothed mixing elements, and the lower diagram shows an enlarged view of section A.

FIG. 9 shows a pair of toothed mixing elements according to the invention. The dimensionless outer diameter at the tips of the teeth (1) is 0.966. The dimensionless core diameter at the bottom of the screw thread (3) is 0.664. The dimensionless screw clearance is 0.009. The pitch of the base geometry is 0.133 times the outer diameter of the toothed mixing element. The number of base geometry periods is therefore nb=7.51. The number of grooves (2) is 12, and the pitch of the grooves is 7.99 times the outer diameter of the toothed mixing element. Increasing the axial distance is used as a clearance strategy. It can be seen that the radial clearance between the screws is substantially greater than the axial clearance.

Figure 10:
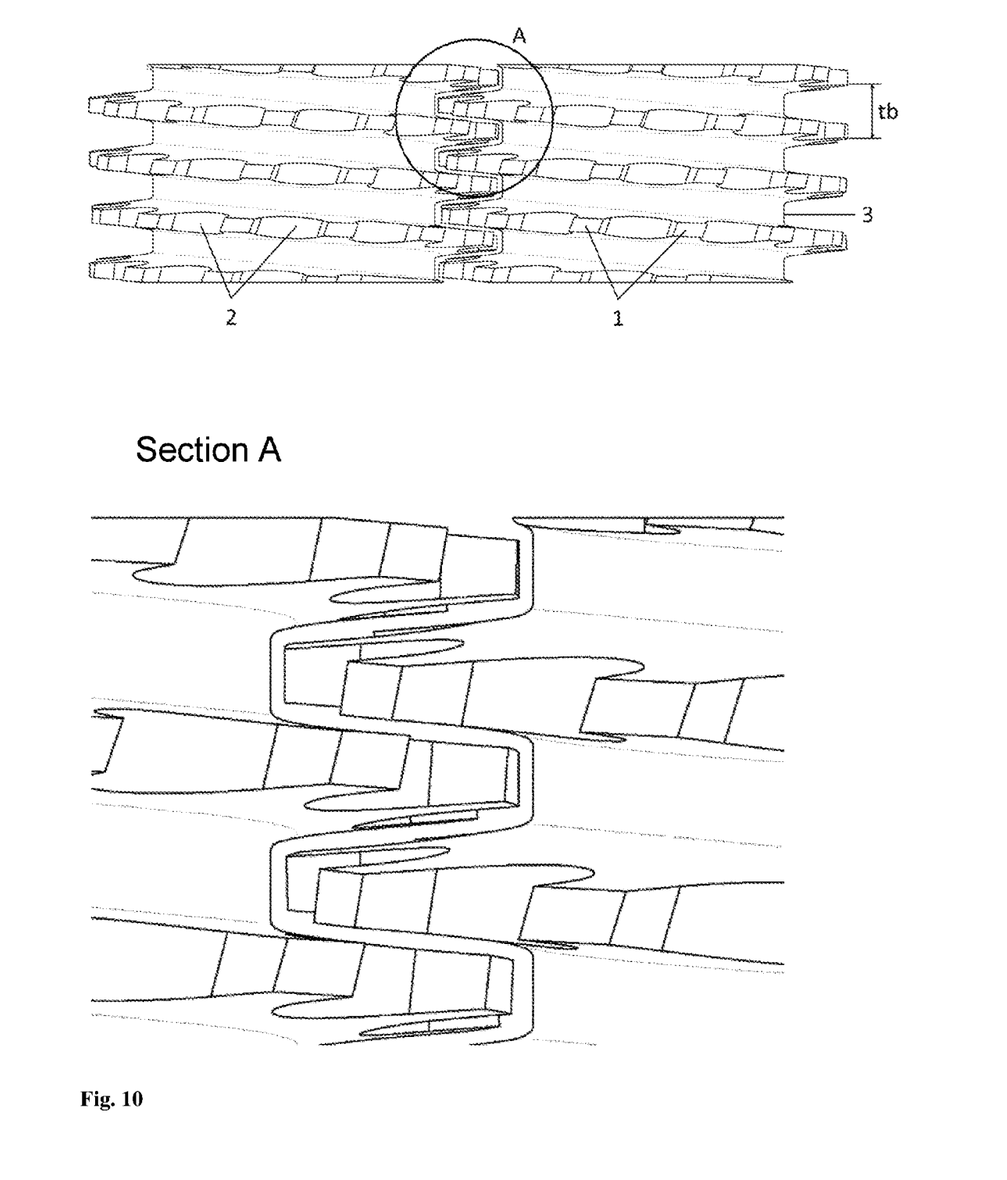
FIG. 10 shows a pair of toothed mixing elements according to the invention whose number of base geometry periods is equal to 7.51 and whose groove pitch is 7.99 times the outer diameter of the mixing element. The spatial equidistants are used as a clearance strategy, resulting in an equal radial and axial clearance between the two mixing elements. The upper diagram shows a side view of the pair of toothed mixing elements, and the lower diagram shows an enlarged view of section A.

FIG. 10 shows a pair of toothed mixing elements according to the invention. The dimensionless outer diameter at the tips of the teeth (1) is 0.966. The dimensionless core diameter at the bottom of the screw thread (3) is 0.664. The dimensionless screw clearance is 0.009. The pitch of the base geometry is 0.133 times the outer diameter of the toothed mixing element. The number of base geometry periods is therefore nb=7.51. The number of grooves (2) is 12, and the pitch of the grooves is 7.99 times the outer diameter of the toothed mixing element. The spatial equidistants are used as a clearance strategy. It can be seen that the radial clearance and the axial clearance between the screws are essentially equal. For the toothed mixing elements according to the invention, the longitudinal section equidistants are preferably used, with the spatial equidistants being particularly preferred.

Figure 11:
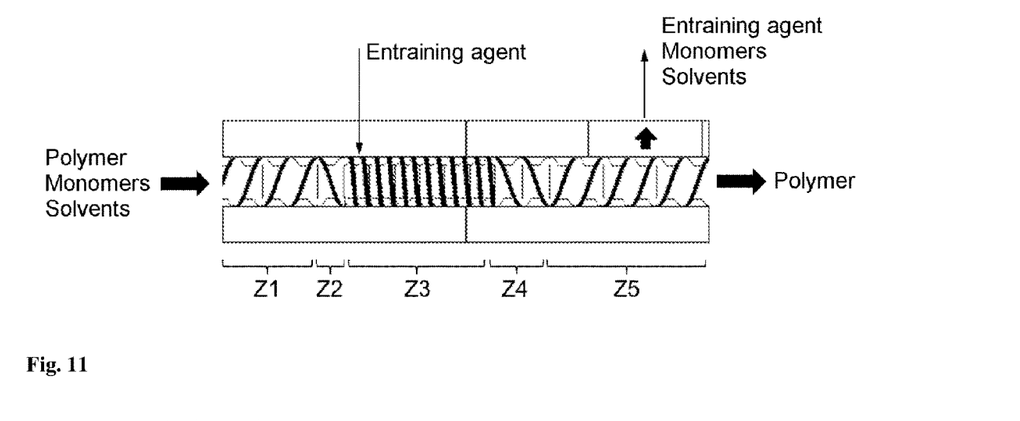
FIG. 11 shows the basic structure of a dispersion zone of a degassing extruder according to the invention.

FIG. 11 shows a typical dispersion zone of a degassing extruder. A dispersion zone essentially comprises 5 zones Z1 to Z5. Polymers, monomers and solvents are added to zone Z1, which is composed of one or a plurality of active-conveying feeding elements. Zone Z1 has the task of building up the pressure required for feeding through zones Z2 to Z4. Zone Z2 is composed of one or a plurality of pressure-consuming screw elements, preferably one or a plurality of neutral or reverse-conveying kneading elements, and particularly preferably one or a plurality of reverse-conveying feeding elements. The pressure consumption in zone Z2 prevents the entraining agent added to zone Z3 from escaping in an upstream direction. Air, carbon dioxide, or water is preferably used as an entraining agent, with nitrogen being particularly preferred. The entraining agent is added at the beginning of zone Z3. Zone Z3 is composed of one or a plurality of dispersion screw elements, preferably one or a plurality of kneading and mixing elements, and particularly preferably one or a plurality of toothed mixing elements. The dispersion zone has the task of dispersing the entraining agent as finely as possible. Zone Z4 is composed of one or a plurality of pressure-consuming screw elements, preferably one or a plurality of neutral or reverse-conveying kneading elements, and particularly preferably one or a plurality of reverse-conveying feeding elements. Zone Z4 has the task of adjusting the pressure in dispersion zone Z3 to a desired pressure level. This is followed by a last zone Z5 that is a partially filled degassing zone in which the monomers and solvents are discharged from the extruder, aided by the entraining agent, via a degassing dome, while the polymer is further conveyed in the extruder in a downstream direction. Zone Z5 is composed of one or a plurality of active-conveying screw elements, and preferably one or a plurality of active-conveying feeding elements. The dispersion of gases is ideally carried out at high pressure so that the entraining agent dissolves better in the polymer, thus allowing improved foaming (greater surface area) in a subsequent degassing zone.

Figure 12:
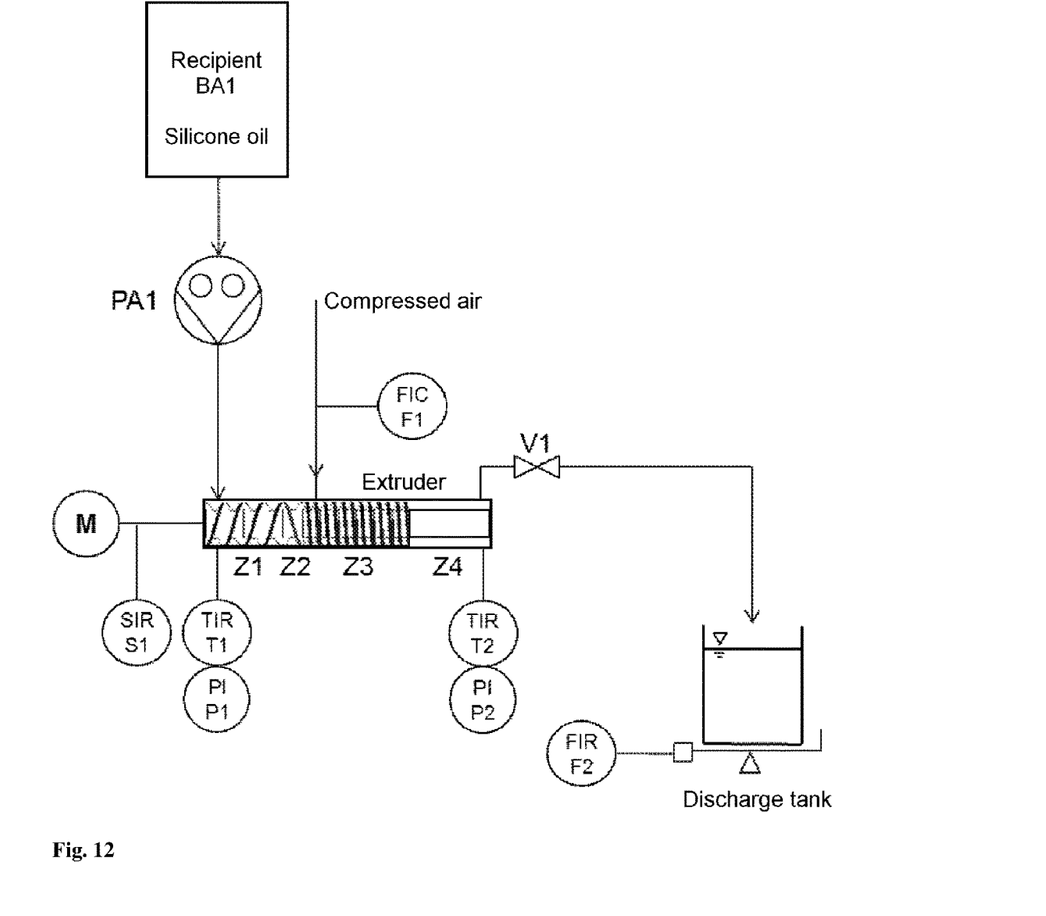
FIG. 12 shows the test structure of a plexiglas extruder.

FIG. 12 shows a double-shaft extruder made of plexiglas in which the tests for visually assessing the gas dispersion efficacy of various mixing elements can be carried out. The barrel inner diameter of the plexiglas extruder is 58.3 mm, and the axial distance between the two shafts is 48 mm. Silicone oil is used instead of polymer melt in these tests, as silicone oil exhibits Newtonian flow behavior at room temperature, as does polycarbonate at 300-350° C. Silicone oil with a viscosity of 10 Pa·s at room temperature is pumped from a recipient BA1 into the extruder by means of a gear pump PA1. At the beginning of the dispersion screw elements, nitrogen is dosed into the extruder, with the mass flow thereof being measured via the measuring site F1. The pressure in the extruder can be adjusted using a valve V1. After the valve V1, the silicone oil is collected in a discharge tank. The extruder is driven by the motor M, and the rotational speed S1 is measured. Moreover, pressures P1 and P2 and temperatures T1 and T2 are measured at the inlet and outlet. The mass flow F2 of silicone oil is determined using a balance. The screw array for the dispersion experiments is composed of a first zone Z1 comprising active-conveying feeding elements with a pitch of 60 mm, a second zone Z2 comprising reverse-conveying feeding elements with a pitch of 60 mm and a length of 30 mm, a third zone Z3 comprising the dispersion screw elements, and a fourth zone Z4 comprising spacer.

Figure 13:
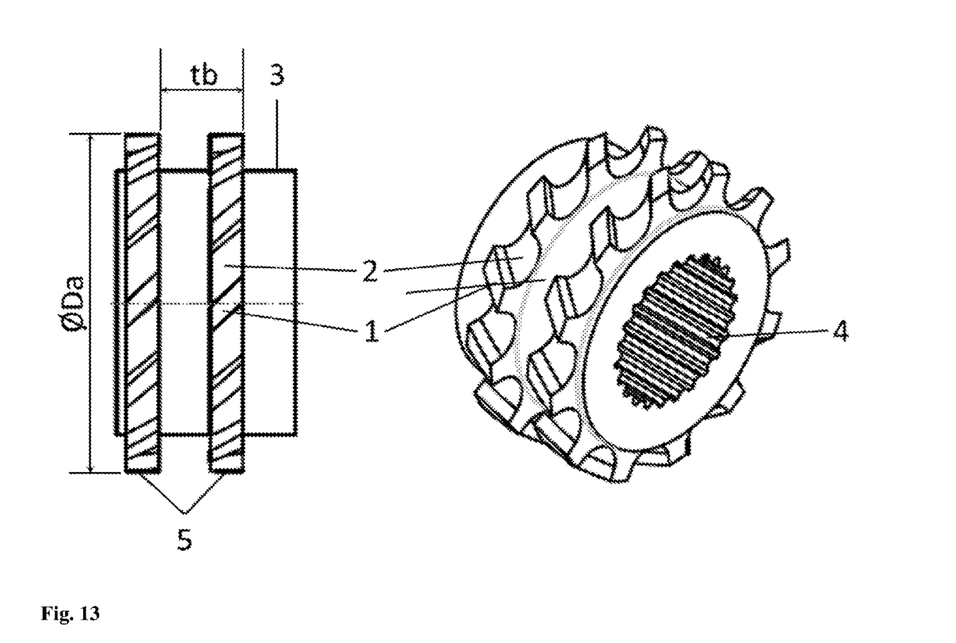
FIG. 13 shows a mixing element of the TME type.

FIG. 13 shows a mixing element of the TME type according to prior art with the rings (5), the teeth (1), the grooves (2), the screw thread (3), the inner toothing (4), the base geometry length tb, and the outer diameter Da.

Figure 14:
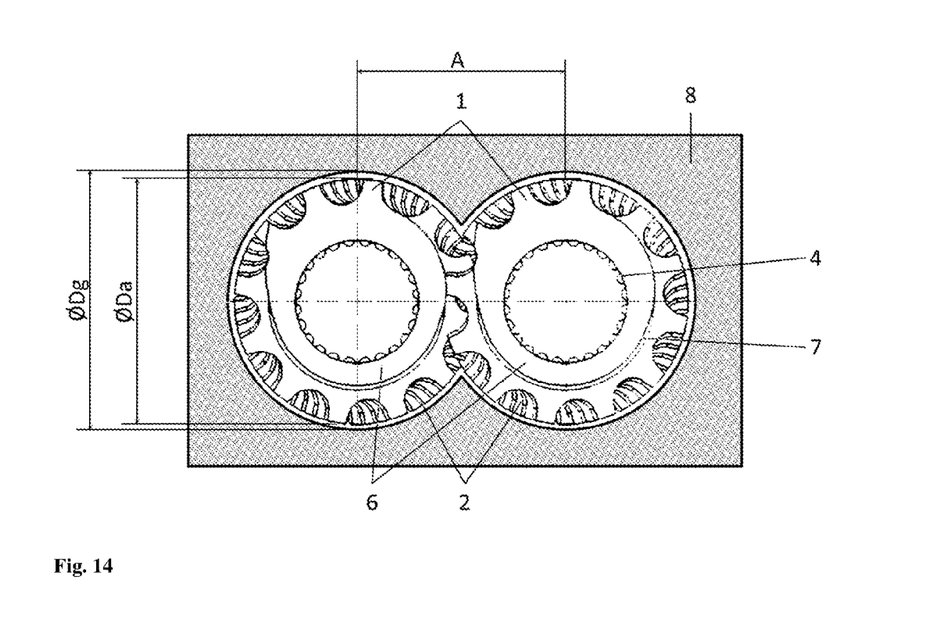
FIG. 14 shows a pair of toothed mixing elements according to the invention in a barrel of a double-shaft extruder.

FIG. 14 shows a pair of novel toothed mixing elements (6) with the outer diameter Da, the core diameter (7), the teeth (1), the grooves (2), and the inner toothing (4) in a barrel (8) of a double-shaft extruder with a barrel inner diameter Dg. The axial distance between the two toothed mixing elements is equal to A. The number of grooves (2) is 12.

The following examples serve to explain the invention in greater detail, and are not to be interpreted as limiting the scope thereof.

EXAMPLES

Example 1

Mixing elements with a double-thread active-conveying feeding element as the base geometry and reverse-conveying grooves according to the prior art were used as dispersion screw elements. These mixing elements are also known to the person skilled in the art as screw mixing elements (SME). The outer diameter at the tips of the teeth was 56.6 mm for an axial length of 150 mm. The base geometry period length tb was 30 mm. The number of base geometry periods was therefore nb=1.89. The number of grooves was 8, and the pitch of the grooves was 120 mm, corresponding to 2.12 times the outer diameter of the toothed mixing element. The absolute pressure at measurement site P1 was 5.5 bar. The rotational speed of the extruder was 18 rpm. The mass flow of silicone oil was 22 kg/h. Nitrogen was dosed at a rate of 10 SL/h (standard liters/h). The nitrogen was dosed via a dosing site. The added nitrogen was distributed over the entire cross-section at the dosing site, as the nitrogen was partially conveyed in a reverse direction following the pressure gradient of an active-conveying screw mixing element, an undesirable effect. After an axial length of approx. 120 mm, elongated gas bubbles with a diameter of more than 10 mm were frequently present.

Example 2

Toothed mixing elements according to prior art were used as dispersion screw elements. The outer diameter at the tips of the teeth was 56.3 mm for an axial length of 150 mm. The base geometry period length tb was 15 mm. The number of base geometry periods was therefore nb=3.75. The number of grooves was 12, and the pitch of the grooves was 180 mm, corresponding to 3.20 times the outer diameter of the toothed mixing element. The absolute pressure at measurement site P1 was 5.5 bar. The rotational speed of the extruder was 18 rpm. The mass flow of silicone oil was 18 kg/h. Nitrogen was dosed at a rate of 10 SL/h (standard liters/h). The nitrogen was dosed via two dosing sites, specifically 45° before the mandrel in the direction of rotation of the two shafts. The added nitrogen was pre-distributed over an axial length of approx. 60 mm. After an axial length of approx.

120 mm, elongated gas bubbles with a diameter of approx. 5 mm were frequently present.

Example 3

Toothed mixing elements were used as dispersion screw elements, wherein the outer diameter at the tips of the teeth was 57.8 mm for an axial length of 60 mm, after which the outer diameter was 56.3 mm for an axial length of 90 mm. The base geometry period length tb was 10 mm. The number of base geometry periods was therefore nb=5.78 or 5.63. The number of grooves was 12, and the pitch of the grooves was 180 mm, corresponding to 3.11 or 3.20 times the outer diameter of the toothed mixing element. The absolute pressure at measurement site P1 was 5.5 bar. The rotational speed of the extruder was 18 rpm. The mass flow of silicone oil was 18 kg/h. Nitrogen was dosed at a rate of 10 SL/h (standard liters/h). The nitrogen was dosed via two dosing sites, specifically 45° before the mandrel in the direction of rotation of the two shafts. The added nitrogen was pre-distributed over an axial length of approx. 30 mm. After an axial length of approx. 120 mm, elongated gas bubbles with a diameter of approx. 3 mm were frequently present.

Example 4

Toothed mixing elements were used as dispersion screw elements, in the case of which toothed mixing elements the outer diameter at the tips of the teeth was 57.8 mm for an axial length of 60 mm, after which the outer diameter was 56.3 mm for an axial length of 90 mm. The base geometry period length tb was 7.5 mm. The number of base geometry periods was therefore nb=7.71 or 7.51. The number of grooves was 12, and the pitch of the grooves was 180 mm, corresponding to 3.11 or 3.20 times the outer diameter of the toothed mixing element. The absolute pressure at measurement site P1 was 5.5 bar. The rotational speed of the extruder was 18 rpm. The mass flow of silicone oil was 18 kg/h. Nitrogen was dosed at a rate of 10 SL/h (standard liters/h). The nitrogen was dosed via two dosing sites, specifically 45° before the mandrel in the direction of rotation of the two shafts. The added nitrogen was pre-distributed over an axial length of approx. 25 mm. After an axial length of approx. 120 mm, elongated gas bubbles with a diameter of approx. 2.5 mm were frequently present.

Example 5

Toothed mixing elements according to the invention were used as dispersion screw elements. The outer diameter at the tips of the teeth was 57.8 mm for an axial length of 60 mm, after which the outer diameter was 56.3 mm for an axial length of 90 mm. The base geometry period length tb was 7.5 mm. The number of base geometry periods was therefore nb=7.71 or 7.51. The number of grooves was 12, and the pitch of the grooves was 450 mm, corresponding to 7.79 or 7.99 times the outer diameter of the toothed mixing element. The absolute pressure at measurement site P1 was 5.5 bar. The rotational speed of the extruder was 18 rpm. The mass flow of silicone oil was 18 kg/h. Nitrogen was dosed at a rate of 10 SL/h (standard liters/h). The nitrogen was dosed via two dosing sites, specifically 45° before the mandrel in the direction of rotation of the two shafts. The added nitrogen was pre-distributed over an axial length of approx. 30 mm. After an axial length of approx. 120 mm, elongated gas bubbles with a diameter of approx. 2.5 mm were frequently present.

The dimensionless intrinsic throughput A1 of various toothed mixing elements was calculated by flow simulation. The commercial software package Ansys Fluent Version 13.0 was used.

The calculations were carried out under isothermal conditions. The mixing element was completely filled with product. The viscosity and density were selected so as to produce laminar flow, i.e. the Reynolds number Re was substantially less than 1. In order to exclude inlet and outlet effects of the mixing element from the calculation results, calculation was carried out in the axial direction with periodic boundary conditions.

The dimensionless outer diameter at the tips of the teeth was 0.983. The dimensionless core diameter at the bottom of the screw thread was 0.627. The dimensionless screw clearance was 0.011. The pitch of the base geometry was 0.132 times the outer diameter of the toothed mixing element. The number of base geometry periods was therefore nb=7.59. The spatial equidistants were used as a clearance strategy. The number of grooves was 12. The pitch of the grooves was varied.

In a first geometry variant, the pitch of the grooves was 4.75 times the outer diameter of the toothed mixing element. The dimensionless intrinsic throughput of this variant is A1=0.0317.

In a second geometry variant, the pitch of the grooves was 5.42 times the outer diameter of the toothed mixing element. The dimensionless intrinsic throughput of this variant is A1=0.0292.

In a third geometry variant, the pitch of the grooves was 5.69 times the outer diameter of the toothed mixing element. The dimensionless intrinsic throughput of this variant is A1=0.0280.

In a fourth geometry variant, the pitch of the grooves was 6.33 times the outer diameter of the toothed mixing element. The dimensionless intrinsic throughput of this variant is A1=0.0253.

In a fifth geometry variant, the pitch of the grooves was 7.12 times the outer diameter of the toothed mixing element. The dimensionless intrinsic throughput of this variant is A1=0.0222.

In a sixth geometry variant, the pitch of the grooves was 7.59 times the outer diameter of the toothed mixing element. The dimensionless intrinsic throughput of this variant is A1=0.0205.

In a seventh geometry variant, the pitch of the grooves was 9.49 times the outer diameter of the toothed mixing element. The dimensionless intrinsic throughput of this variant is A1=0.0145.

The energy requirement during flow through the various toothed mixing elements remains virtually. It differs by a maximum of 1%.

As described in [2], typical dimensionless throughputs of a degassing extruder are in the range of Q=0.03-0.06. If the screw extruder is operated with a dimensionless throughput of Q=0.03, only with the fifth geometry variant (i.e. only with the variants according to the invention) is a dimensionless intrinsic throughput of A1=0.0222 achieved that is less than 80% of the dimensionless throughput Q. If the screw extruder is operated with a dimensionless throughput of Q=0.03, only with the seventh geometry variant is a dimensionless intrinsic throughput of A1=0.0145 that is less than 60% of the dimensionless throughput Q.

The invention claimed is:
1. Mixing elements for multi-shaft screw extruders, wherein the mixing elements comprise screw shafts that co-rotate in pairs, wherein the number of base geometry periods in a longitudinal section of one of the mixing elements that corresponds lengthwise to an outer diameter of the mixing elements is greater than or equal to 5.5, wherein the base geometry of the mixing elements comprises a reverse-conveying feeding element with a single-thread screw Erdmenger profile, wherein the base geometry comprises combs, wherein the combs are provided with active-conveying grooves, and wherein the pitch of the conveying grooves is at least 7 times the outer diameter of the mixing elements.

2. The mixing elements as claimed in claim 1, wherein the number of base geometry periods in a longitudinal section that corresponds lengthwise to the outer diameter of the mixing elements is greater than or equal to 5.5 and less than or equal to 10.

3. The mixing elements as claimed in claim 1, wherein the number of base geometry periods in a longitudinal section that corresponds lengthwise to the outer diameter of the mixing elements is greater than or equal to 7.

4. The mixing elements as claimed in claim 1, wherein the pitch of the conveying grooves is at least 9 times the outer diameter of the mixing elements.

5. A multi-shaft screw extruder comprising screw shafts that co-rotate in pairs comprising the mixing elements according to claim 1.

6. A multi-shaft screw extruder comprising screw shafts that co-rotate in pairs, wherein the screw shafts have the following sequence of screw elements as a dispersion zone:
(i) active-conveying screw elements;
(iii) mixing elements according to claim 1; and
(v) active-conveying screw elements.

7. The screw extruder as claimed in claim 6, wherein the screw shafts comprise the following sequence of screw elements as a dispersion zone:
(i) active-conveying screw elements;
(ii) at least one reverse-conveying screw element;
(iii) the mixing elements according to claim 1;
(iv) at least one reverse-conveying screw element; and
(v) active-conveying screw elements.

8. The screw extruder as claimed in claim 6, wherein the screw extruder contains 1 to 8 dispersion zones.

9. The screw extruder as claimed in claim 7, wherein the mixing elements (iii) have a smaller outer diameter than at least one of the screw elements (i) and (ii), and wherein the mixing elements (iii) have a smaller outer diameter than at least one of the screw elements (iv) and (v).

10. The screw extruder as claimed in claim 6, wherein the mixing elements (iii) have an intrinsic throughput A1 when the screw extruder is operated with a dimensionless volume flow Q, and wherein the intrinsic throughput A1 of the mixing elements (iii) is a maximum of 0.8 times the dimensionless volume flow Q.

11. The screw extruder as claimed in claim 10, wherein the intrinsic throughput A1 of the mixing elements (iii) is a maximum of 0.6 times the dimensionless volume flow Q.

12. A method comprising extruding a plastic mass in a screw extruder according to claim 6.

13. The method as claimed in claim 12, wherein the mixing elements (iii) disperse gaseous, liquid, or powdered additives.

14. The method as claimed in claim 12, wherein the plastic mass comprises thermoplastics or elastomers.

15. The method as claimed in claim 14, wherein a (co)polycarbonate or a blend comprising at least one (co) polycarbonate is used as a thermoplastic.

16. The screw extruder as claimed in claim 6, wherein the screw extruder contains 1 to 6 dispersion zones.

17. The screw extruder as claimed in claim 6, wherein the screw extruder contains 1 to 4 dispersion zones.

18. The screw extruder as claimed in claim 6, wherein the mixing elements (iii) have a smaller outer diameter than the screw elements (i), and wherein the mixing elements (iii) have a smaller outer diameter than the screw elements (v).

* * * * *